US009216526B2

(12) United States Patent
Zander et al.

(10) Patent No.: US 9,216,526 B2
(45) Date of Patent: Dec. 22, 2015

(54) INJECTION COMPRESSION MOLDING SYSTEM AND METHOD

(71) Applicant: Cadillac Products Automotive Company, Troy, MI (US)

(72) Inventors: Robert J. Zander, Troy, MI (US); Ken Ritzema, Clarkston, MI (US); Kevin Morse, Lake Orion, MI (US); Michael P. Williams, Bloomfield Hills, MI (US)

(73) Assignee: Cadillac Products Automotive Company, Troy, MI (US)

( * ) Notice: Subject to any disclaimer, the term of this patent is extended or adjusted under 35 U.S.C. 154(b) by 0 days.

(21) Appl. No.: 14/528,069

(22) Filed: Oct. 30, 2014

(65) Prior Publication Data

US 2015/0118343 A1    Apr. 30, 2015

Related U.S. Application Data

(60) Provisional application No. 61/898,166, filed on Oct. 31, 2013.

(51) Int. Cl.
*B29C 45/04* (2006.01)
*B29C 45/56* (2006.01)
(Continued)

(52) U.S. Cl.
CPC .............. *B29C 45/04* (2013.01); *B29C 45/561* (2013.01); *B29C 2043/5825* (2013.01); *B29C 2045/5615* (2013.01); *B29K 2101/00* (2013.01); *B29L 2031/772* (2013.01)

(58) Field of Classification Search
CPC ..................................................... B29C 45/04

USPC .................. 425/4 R, 4 C, 817 R, 817 C, 589; 264/40.7
See application file for complete search history.

(56) References Cited

U.S. PATENT DOCUMENTS 3,156,014 A * 11/1964 Wenger ............... B29C 45/6714
425/589
4,219,322 A    8/1980 Chang et al.
(Continued)

FOREIGN PATENT DOCUMENTS

GB          1449472 A       9/1976

OTHER PUBLICATIONS

Written Opinion of the International Searching Authority for PCT/US2014/063359 mailed Feb. 24, 2015.
(Continued)

*Primary Examiner* — Tim Heitbrink
(74) *Attorney, Agent, or Firm* — Harness, Dickey & Pierce, P.L.C.

(57) ABSTRACT

An injection compression molding system includes a mold having a fixed first half and a displaceable second half. The second half is initially positioned with a cavity between the mold halves having a first clearance sized to receive a molten material puddle shot injected by an injection molding device without the puddle shot filling the cavity. A displacement device acts during or immediately after puddle shot injection, displacing the second mold half toward the first mold half creating a second clearance less than the first clearance. The second clearance defines a finished part thickness whereby displacement of the second mold half to the second clearance compresses the puddle shot so that the puddle shot fills the cavity and forms a finished part between the mold halves. Total time to inject and compress the puddle shot is less than or equal to 1.0 seconds.

10 Claims, 4 Drawing Sheets

(51) Int. Cl.
  *B29C 43/58* (2006.01)
  *B29K 101/00* (2006.01)
  *B29L 31/00* (2006.01)

(56) References Cited

U.S. PATENT DOCUMENTS

| | | | |
|---|---|---|---|
| 4,828,769 A | 5/1989 | Maus et al. | |
| 5,922,266 A | 7/1999 | Grove | |
| 7,704,423 B2 | 4/2010 | Takatori et al. | |
| 2013/0224508 A1 | 8/2013 | Todesco et al. | |
| 2015/0008608 A1* | 1/2015 | Aine et al. | 264/50 |
| 2015/0049295 A1* | 2/2015 | Larson et al. | 351/117 |
| 2015/0064379 A1* | 3/2015 | Roberts | 428/36.5 |

OTHER PUBLICATIONS

International Search Report for PCT/US2014/063359 mailed Feb. 24, 2015.

* cited by examiner

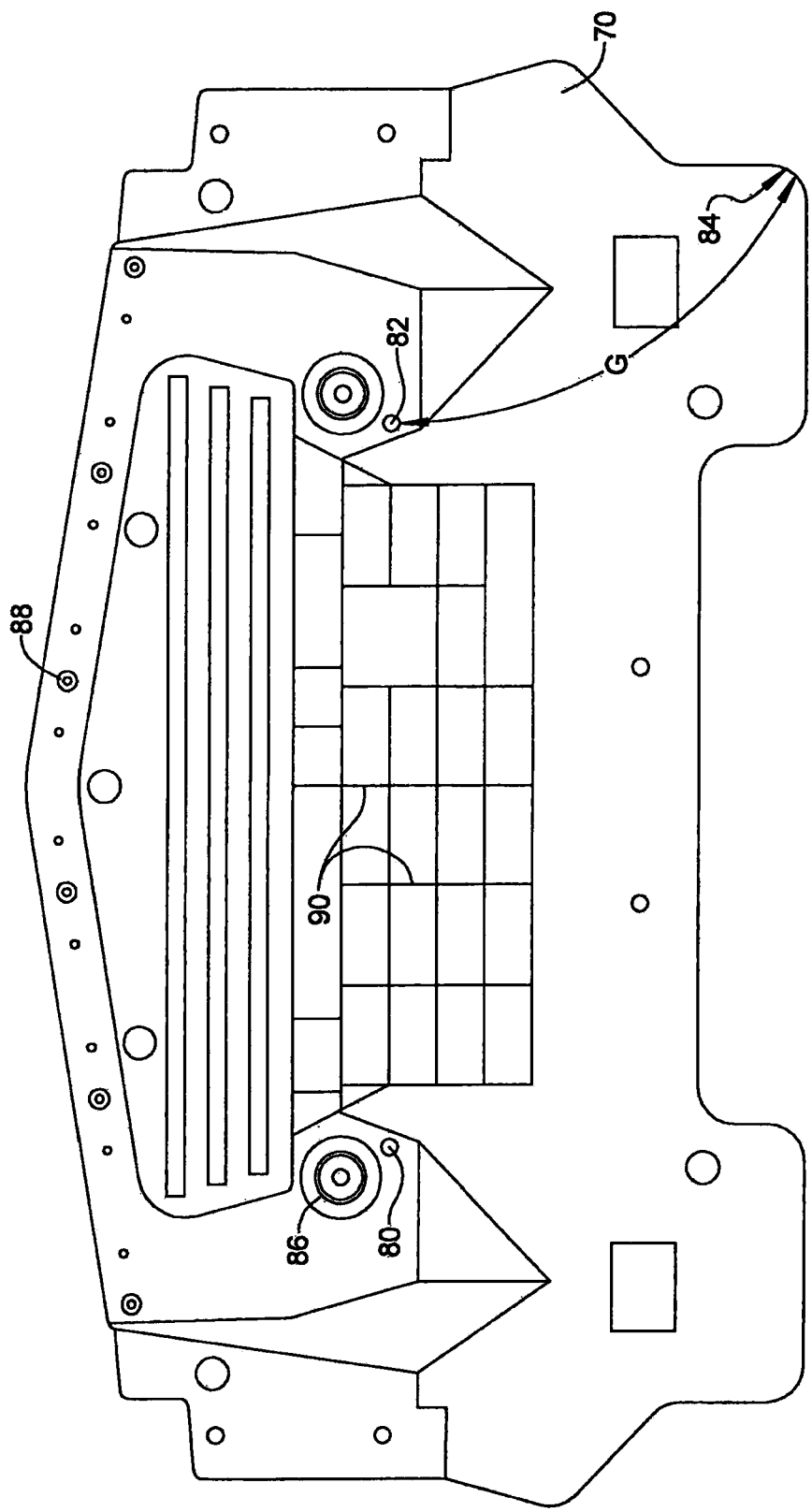

US 9,216,526 B2

INJECTION COMPRESSION MOLDING SYSTEM AND METHOD

CROSS-REFERENCE TO RELATED APPLICATION

This application claims priority to U.S. Provisional Patent Application No. 61/898,166 filed on Oct. 31, 2013, the entirety of which is hereby incorporated by reference.

FIELD

The present disclosure relates to plastics injection molding systems, methods and the products produced by the method.

BACKGROUND

This section provides background information related to the present disclosure which is not necessarily prior art.

Plastic components such as vehicle under-body closeouts are used to reduce the air turbulence under automobile vehicles. The air dams or panels must be thin to reduce weight and cost, while still made of a polymeric material that provides sufficient stiffness to maintain the part geometry. Currently, these parts are made using a thermoforming process which initially extrudes a thin wall (approximately 1.5 to 2.0 mm) plastic sheet. The extruded sheet is then thermoformed with one or more dies or molds to create the overall geometry or shape of the part, including reinforcing components, ribs for stiffness, apertures for fasteners and the like. The part is finally die cut to produce its final or finished geometry. Thermoformed parts therefore require multiple manufacturing steps which impart increased cost and time to manufacture. Thermoforming is also limited in that components such as additional thickness reinforcing walls positioned where fasteners will be mounted and at high stress locations cannot be created during the thermoforming step, which is limited to the uniform wall thickness of the sheet, and therefore these areas must be added (such as by adhesive or thermal bonding) in a later manufacturing step.

Injection molding processes are known which provide greater part geometric shapes than thermoforming. However, known injection molding processes are unable to produce parts having a surface area of multiple square feet in the desired thickness range, because the material solidifies too quickly to allow full flow-out of the plastic material throughout the mold. In known injection molding processes, injection mold halves are typically held under high pressure at a clearance defining the final or desired wall thickness of the part (for example 2.0 to 3.0 mm). Because the molten plastic must flow out to the far extents of the mold, multiple gates or drops are used, increasing mold costs. In addition, the time required to force plastic to flow throughout the mold creates extreme pressure in the mold because the plastic immediately begins to cool and thicken during the injection phase. Conventional injection molding therefore requires high tonnage presses (approximately 1-3 tons per square inch) to hold the mold halves in position as the molten plastic is injected under pressure. A total mold fill time of approximately 4 seconds is required for a conventional injection molding process, not including cooling time of approximately 45 seconds.

SUMMARY

This section provides a general summary of the disclosure, and is not a comprehensive disclosure of its full scope or all of its features.

According to several aspects, an injection compression molding system includes a mold having a fixed first half and a second half displaceable with respect to the first half. The second half is initially positioned such that a cavity between the first and second halves defines a first clearance sized to receive an amorphous-shaped puddle shot of a molten polymeric material injected into the cavity by operation of an injection molding device. The first clearance is selected to prevent the puddle shot from filling the cavity. A displacement device acts immediately during or after injection of the puddle shot to displace the second mold half toward the first mold half creating a second clearance between the first and second mold halves that is less than the first clearance. The second clearance defines a finished part thickness. Displacement of the second mold half to the second clearance compresses the puddle shot until a finished part is created between the first and second mold halves. A total time required to inject the puddle shot and compress the puddle shot according to several aspects is less than or equal to 1.0 seconds, and according to further aspects is less than or equal to 5.0 seconds (with a 3.0 second maximum injection time and a 2.0 second maximum coining time).

According to other aspects, an injection compression molding method has an injection molding screw displaced by a first accumulator, a mold having a fixed first half and a displaceable second half, with a position controlled high speed clamp aligned with the mold second half. The method comprises steps including: initially positioning the second mold half such that a cavity between the first and second halves defines a first clearance; displacing the injection molding screw by application of pressure from the first accumulator to inject an amorphous-shaped puddle shot of a molten polymeric material into the cavity, wherein the puddle shot does not fill the cavity; actuating the high speed clamp during or after injection of the puddle shot to displace the second mold half toward the first mold half thereby compressing the puddle shot until a second clearance being less than the first clearance and defining a finished part thickness is created between the first and second mold halves; and performing the displacing and actuating steps (the coining step) in 2.0 seconds or less and according to several aspects in 0.7 seconds or less.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a top plan view of a finished part created using the injection compression molding process of the present disclosure.

DETAILED DESCRIPTION

Example embodiments will now be described more fully with reference to the accompanying drawings.

Figure 1:
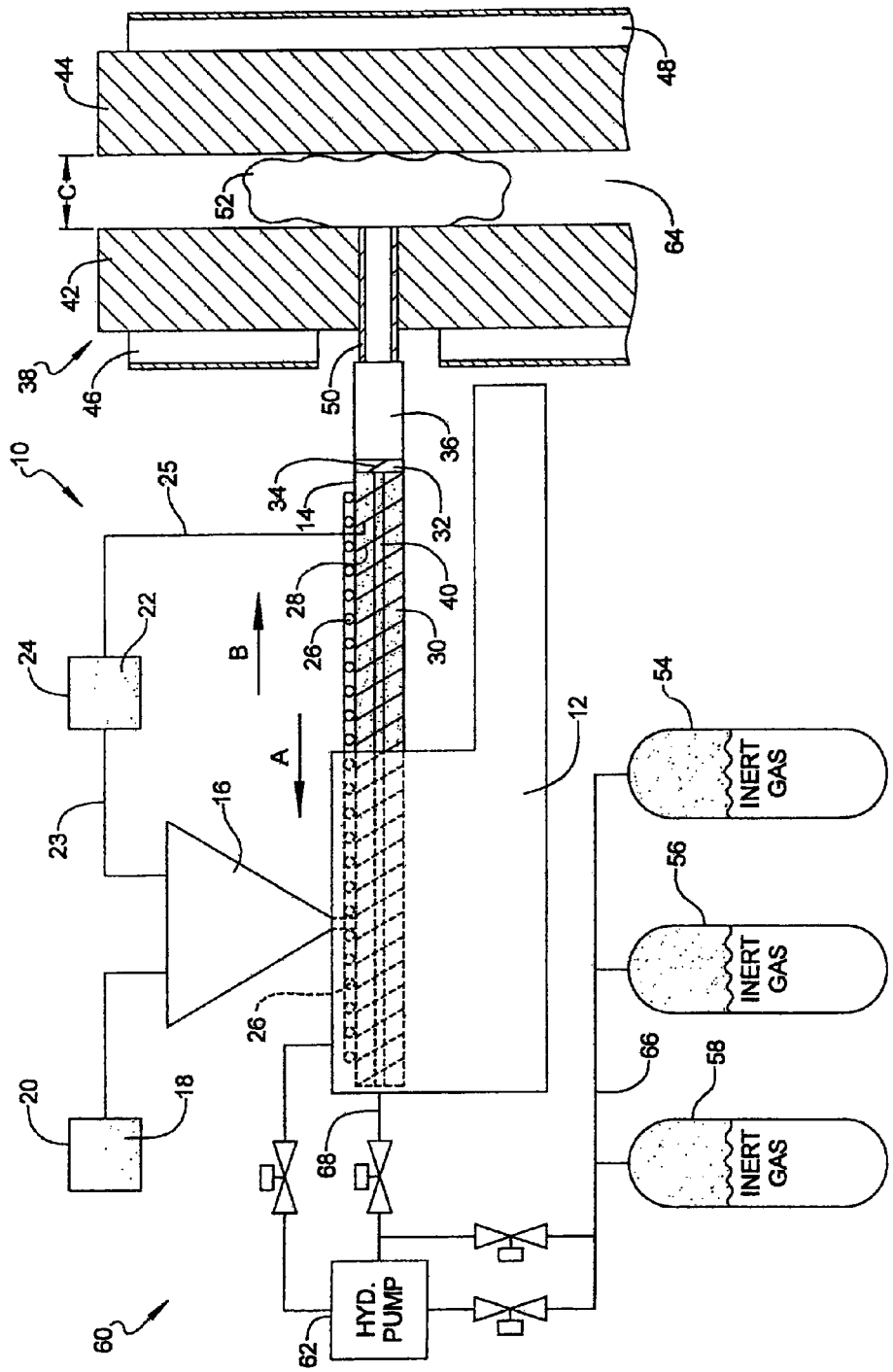
FIG. 1 is a diagrammatic view of an injection compression molding system of the present disclosure, shown after formation of a puddle shot of polymeric material between mold halves.

Referring to FIG. 1, according to several aspects and referring generally to FIG. 1, an injection compression molding system 10 includes an injection molding machine 12 having a screw section 14 which is connected to a mixing chamber 16. A resin material 18 provided for example as resin beads from a resin reservoir 20 is transferred to mixing chamber 16. A foaming or blowing agent 22 in a pellet form can be provided which is transferred via a transfer line 23 to the mixing chamber 16 from a blowing agent reservoir 24. The volume of blowing agent 22 compared to a volume of the resin material 18 are controlled to provide a desired percentage of blowing agent to resin in a molten mixture to be created in injection molding machine 12.

According to other aspects, the foaming or blowing agent 22 can initially be in the form of a gas which is stored in blowing agent reservoir 24. When gas is used as the blowing agent 22, the blowing agent 22 can be introduced into the melt stream. Also, when gas is used as the blowing agent 22, transfer line 23 to mixing chamber 16 is not used, and instead the gas is transferred directly into the screw section 14 via a separate gas transfer line 25.

When blowing agent 22 is used, resin 18 and blowing agent 22 are mixed, by predetermined weights and/or by volume percentages, within mixing chamber 16 and transferred as a volume of resin and blowing agent to screw section 14. Resin material 18 can be one of a plurality of thermoplastic materials, including but not limited to polyethylene, polypropylene, LLDPE, LDPE, TPO, aliphatic polyamide, Ionomer, acrylonitrile styrene (ABS), polystyrene, or other polymeric materials including filled variations (e.g. talc mineral and glass).

A heating device 26 is connected to screw section 14. A screw thread 28 is created on an injection molding screw 32 and both screw thread 28 and injection molding screw 32 are rotatably and axially received within screw section 14. Cavities between the thread peaks of screw thread 28 receive the volume of resin 18 and blowing agent 22. Injection molding screw 32 is initially positioned by axial displacement in a retraction direction "A" as shown in FIG. 1 as the volume of resin 18 and blowing agent 22 is received in screw section 14. The volume of resin 18 and blowing agent 22 is axially displaced using screw thread 28 by rotation of injection molding screw 32. A resin/blowing agent mixture 30 is created by heating the volume of resin 18 and blowing agent 22 in screw section 14 using heating device 26, and is liquefied under pressure to prevent gases produced by the blowing agent 22 from expanding the mixture prematurely.

The resin/blowing agent mixture 30 is transferred through a one-way valve flow device which in several aspects is a check valve 34 into a mixture receiving portion 36 of screw section 14 by rotation and axial displacement of screw thread 28. The check valve 34 is oriented to permit flow of the resin/blowing agent mixture in the receiving portion of the screw section only toward an injection compression mold 38. As mixture 30 enters mixture receiving portion 36, mixture 30 assists in axially translating injection molding screw 32 in the retraction direction "A".

Following heating to create mixture 30 which creates a predetermined volume of mixture 30 in mixture receiving portion 36, rotation of injection molding screw 32 is stopped and injection molding screw 32 is thereafter axially translated in an injection direction "B" to inject mixture 30. From mixture receiving portion 36, mixture 30 is injected as a shot of material into injection compression mold 38. A screw body 40 having a predetermined diameter defines the root diameter of screw thread 28 and therefore the spacing filled by the volume of resin 18 and blowing agent 22 from the root diameter to the inner wall of screw section 14. Backflow (toward retraction direction "A") of mixture 30 during injection is prevented by the orientation of check valve 34.

The injection compression mold 38 includes a fixed first half 42 and a movable second half 44, each of which have temperature controlling lines 46 or 48 which are provided with coolant that allows the temperature of the mold to be controlled between 10 C-80 C. The first and second cavity halves 42, 44 are initially aligned vertically, with a clearance "C" between the two mold halves 42, 44 of approximately 4.0 to 10.0 mm. This is in direct contrast to conventional injection mold processes which hold mold halves at a desired final spacing determined by the nominal wall thickness of the finished part and apply high pressure to the mold halves as the injection mixture is inserted into the mold.

The plastic resin mixture 30 is injected through a drop injector 50 extending through the fixed first half 42. A "puddle shot" 52 of the molten plastic injection mixture 30 having an amorphous geometry is thereby positioned between the first and second mold halves 42, 44 while they are spaced apart from each other at the initial mold position or clearance "C". According to several aspects the outputs of multiple accumulators 54, 56, 58 are aligned with the injection molding screw 32 to maximize an injection speed of the injection molding screw 32 with an optimum goal of providing an injection time for the puddle shot 52 of approximately 0.2 to 0.7 seconds and according to several aspects up to approximately 3.0 seconds.

To both rotate screw thread 28 and axially displace injection molding screw 32 in the injection direction "B", a hydraulic system 60 is provided having a hydraulic pump 62 which is connected to the accumulators 54, 56, 58. Fluid pressure created by hydraulic pump 62 together with the pressure provided by accumulators 54, 56, 58 directs injection molding screw 32 to displace the mixture 30 in mixture receiving portion 36 through the drop injector 50 and into a cavity 64 defined between first and second mold halves 42, 44 when the first and second mold halves 42, 44 are spaced at the clearance "C".

Hydraulic fluid of each of the first, second and third accumulators 54, 56, 58 is transferred through an accumulator header 66. Hydraulic fluid in each of the first, second and third accumulators 54, 56, 58 as well as hydraulic fluid discharged by hydraulic pump 62 is directed through a hydraulic injection header 68 to rotate injection molding screw 32 and/or control the axial position of injection molding screw 32. It is noted that the quantity of accumulators can vary from the quantity of three identified herein. The quantity of accumulators is predetermined at least in part by the size of the injection molding machine 12, the volume of mold 38, and the capacity of hydraulic pump 62. In some instances, accumulators 54, 56, 58 may be eliminated entirely, however; one or more multiple accumulators provide a more rapid displacement of injection molding screw 32. Preferably, the hydraulic pump 62 and the accumulators 54, 56, 58 are sized to inject the puddle shot 52 during the injection step in the optimum puddle shot injection period of approximately 0.2 to 0.7 seconds, and according to other aspects in less than or equal to approximately 3.0 seconds.

The first and second mold halves 42, 44 are initially spaced at clearance "C" to minimize injection pressure during injection of the puddle shot 52, and clearance "C" is predetermined to permit all of the necessary plastic resin mixture 30 to enter cavity 64 within the optimum puddle shot injection period of approximately 0.2 to 0.7 seconds and according to other aspects in approximately 3.0 seconds. Puddle shot 52 therefore does not fill cavity 64, but provides a sufficient volume of plastic resin mixture 30 to create a finished part after a subsequent displacement of the second mold half 44 in a coining step.

Referring to FIG. 2 and again to FIG. 1, either after the puddle shot 52 is injected, or according to several aspects during injection of puddle shot 52, a high speed coining step is performed which displaces the second mold half 44 in a closing direction "D", until a predetermined clearance "E" ranging between approximately 1.0 mm to 2.5 mm results between the first and second cavity halves 42, 44. Predetermined clearance "E" equates to and thereby defines a wall thickness of a finished part 70. According to several aspects the coining step is optimally performed in 0.7 seconds or less and according to other aspects is performed in approximately 2.0 seconds or less. The time to displace second mold cavity half 44 in the closing direction "D" defines the coining step. To achieve this rapid coining time, a high speed variable position control clamp assembly 72 is used. Variable position control clamp assembly 72 is connected to second mold cavity half 44 and allows the second mold cavity half 44 to be moved first to the puddle shot injection position at clearance "C", and then moved to the coining position defined by clearance "E" within the same injection/coining process. As previously noted the time to inject the puddle shot 52 of molten plastic material is optimally 0.2 to 0.7 seconds and can be up to approximately 3.0 seconds. A total required time for the puddle shot injection plus coining is therefore optimally approximately 1.0 seconds or less, and according to other aspects can be up to approximately 5.0 seconds or less.

The high speed coining step creates the final thin wall part 70 using a fraction of the mold tonnage normally associated with injection molding. For example, instead of a press applying 1-3 tons per square inch of pressure to the mold 38 to hold the first and second mold halves 42, 44 at a finished part spacing, a press utilizing approximately 0.5 tons per square inch or less capacity (50% of the conventional injection molding tonnage or less) can be used. This is because the high speed coining step occurs with the puddle shot 52 still in its heated and molten state, and multiple vent paths 74, 76 are provided for air/gas to escape while containing the molten plastic within the mold 38. The part 70 is "coined" or shaped to the final geometry of the mold 38 during the high speed coining step. After holding for a cooling period, the mold 38, having the finished part 70 connected to the second mold half 44, is opened and the part 70 is removed, ready to be shipped. No further manufacturing steps are required for final sizing, addition of reinforcing areas, or the like.

It is noted the temperature controlling lines 46, 48 which allow the temperature of the mold to be controlled between 10 C-50 C and in some cases 10 C-80 C. By maintaining the first and second mold halves 42, 44 between 10 C-50 C, a total mold cycle time from the start of the injection process to removal of the finished part 70 from the mold 38 of less than 1 minute is achieved. The ability to use 10 C-50 C mold temperatures is achieved due to the rapid injection time (0.2 to 0.7 seconds) and up to 3.0 seconds, which prevents the plastic resin mixture 30 from solidifying before compression, and is further aided by keeping the total time for the coining step to 0.7 seconds or less and according to several aspects up to 2.0 seconds. Known injection compression molding processes apply higher temperatures to the mold halves to prevent cooling of the resin mixture during molding, and/or insulate the mold halves to prevent cooling of the resin mixture.

Figure 2:
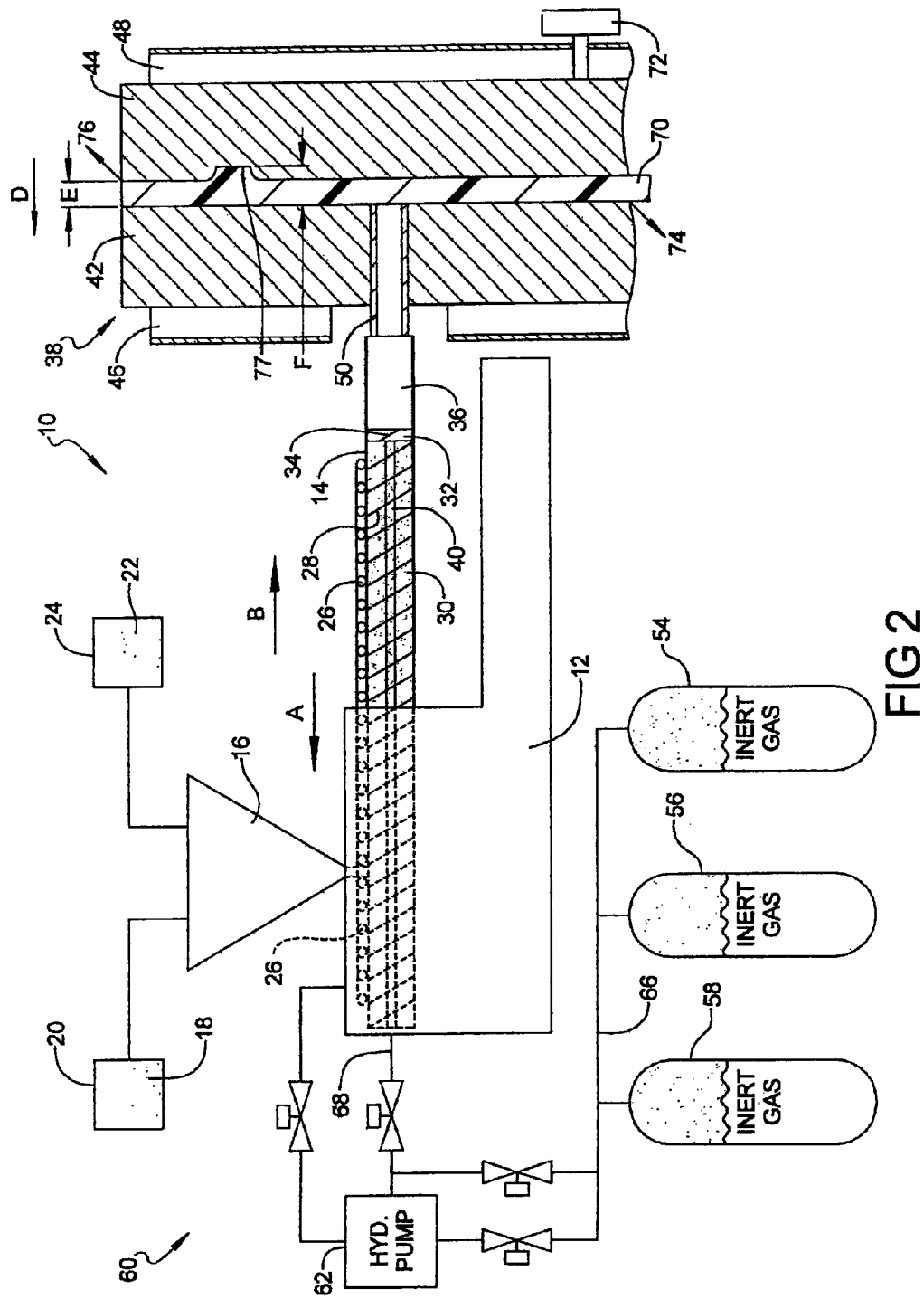
FIG. 2 is a diagrammatic view modified from FIG. 1 to show the mold halves and finished part after a coining step closing the mold halves.

With continued reference to FIG. 2, the use of blowing agent 22 in injection compression molding system 10 improves on known injection molding and/or injection compression molding processes for the following reasons. Blowing agent 22 allows the plastic resin mixture 30 to fill one or more increased wall thickness areas 77 of finished part 70. Increased wall thickness areas 77 can have a wall thickness "F" which is greater than the predetermined clearance "E" defining the nominal wall thickness of finished part 70. Increased wall thickness areas 77 can be used for example to provide additional thickness for reinforcement where fasteners are received through the finished part 70, at locations such as at bends where higher stress can occur, and/or where reinforcement ridges or ribs are positioned. Standard injection molding and injection compression molding processes are not well suited for providing increased wall thickness areas 77 because the time required to flow out the plastic resin mixture before solidification occurs may not be sufficient without the aid of the blowing agent 22. The use of blowing agent 22 together with the rapid injection and coining steps used in the process and with the components of compression molding system 10 provides for areas of differing wall thickness in the finished part 70 without adding any further time or steps to the process.

Figure 3:
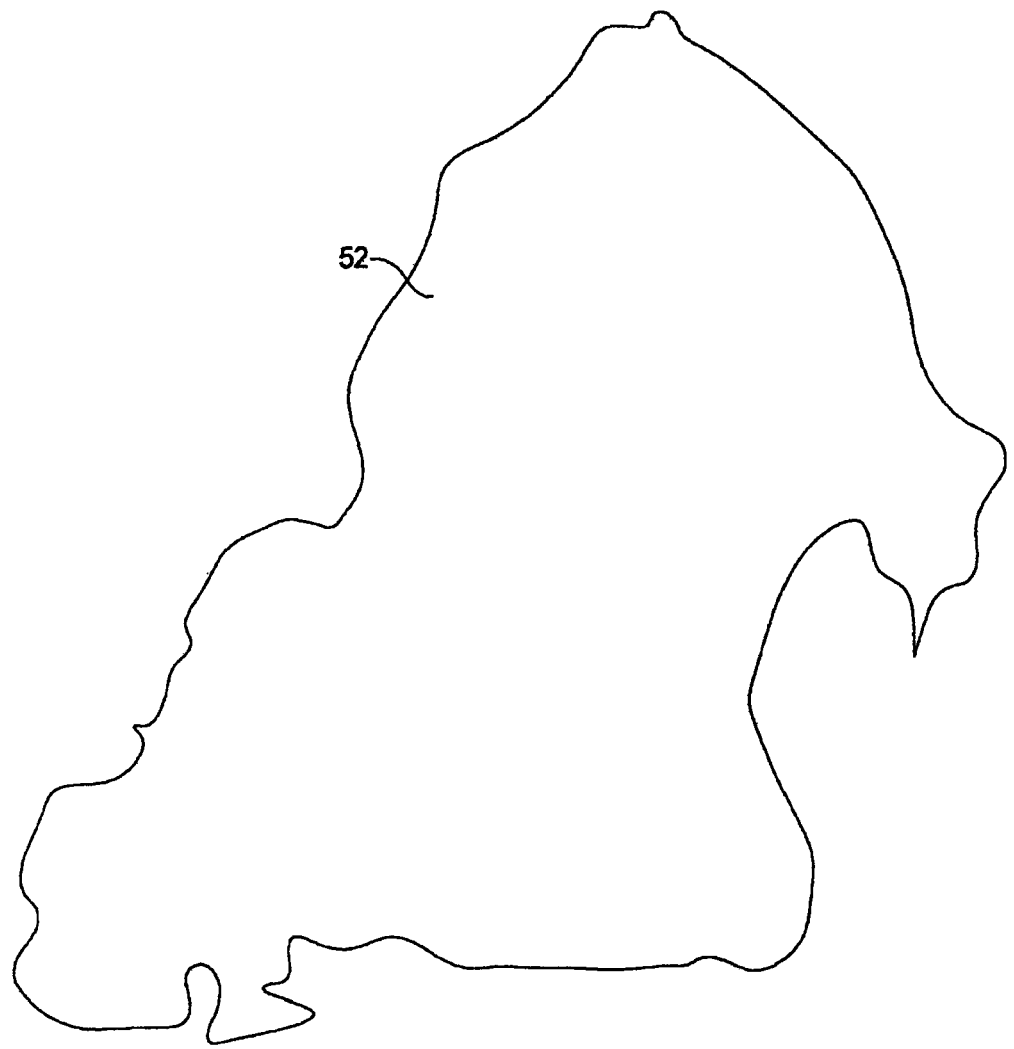
FIG. 3 is a top plan view of an amorphous-shaped puddle shot of polymeric material provided prior to the coining step.

Referring to FIG. 3 and again to FIGS. 1-2, the amorphous appearance of the puddle shot 52 is provided. Puddle shot 52 has a total volume of plastic material required to fill mold 38 at a desired wall thickness of the finished part 70. As previously noted, injection of the puddle shot 52 occurs in a time period of approximately 0.2 to 0.7 seconds and can be up to 3.0 seconds.

Referring to FIG. 4, the part 70 (which can be approximately 1500 cm$^2$ or larger area, with a 1.5 mm or less nominal wall thickness) can be made using as few as two injection locations or drops 80, 82 where the molten plastic injection mixture 30 is injected. One of the advantages of the present injection compression molding process is that a flow distance "G" between the drop 80 or 82 and an edge 84 of part 70 can be significantly increased. For example, the flow distance "G" achieved by the present process can be approximately 38.1 cm (15 in) for a part having a wall thickness of 1.5 mm (0.06 in), which is substantially greater than the 18.0 cm (7 in) maximum distance achievable by conventional injection molding or known injection compression molding processes. Distance "G" therefore provides a measurable indication of the presence of the injection compression molding process of the present disclosure. In its finished molded condition distance "G" of part 70 will indicate the distance traveled by the molten injection molding material of the puddle shot 52 between one of the drops 80, 82 and the outer edge 84 of part 70 at the completion of the coining step.

In a conventional injection molded part, the total travel distance between the injection point or drop and an outer part edge is typically limited to approximately 18.0 cm (7 in) or less. The present injection compression molding process can be used with substantially any family of thermoplastic resin material, including polyethylene and polypropylene. The foaming agent 22 can also be added to the plastic resin 30 to enhance material flow in the mold 38. While conventional injection molding processes typically use an injection speed of approximately 10.16 to 15.24 cm/sec (4 to 6 in/sec), the present injection compression molding process uses an injection speed ranging from approximately 10.16 cm/sec (4 in/sec) to approximately 86.36 cm/sec (34 in/sec) by the use of hydraulic system 60. Advantageously, this injection speed enables flow distances "G" in excess of 18 cm (7 in) for a part 70 having a thickness of 1.5 mm (0.06 in).

Injection compression molding system 10 of the present disclosure also allows for localized wall thickness variations such as the addition of raised features 86, the incorporation of increased wall thickness features such as raised buttons 88, and/or the incorporation of standing ribs 90 at substantially any location in par 70. These features are not available in the as-molded condition of plastic components which rely on the initial use of a sheet formed body that is trimmed and shaped for similar applications such as for automobile vehicle underbody panels.

An injection molding process 10 of the present disclosure provides thin-walled (from less than or equal to 1.0 mm, 1.5 mm and up to 2.0 mm thick) and approximately 1500 $cm^2$ or greater surface area parts 70. According to several aspects, an exemplary finished part 70 can include: a surface area greater than 1500 $cm^2$; a finished part nominal or mean thickness less than 1.5 mm; and one or more localized wall thickness areas greater than 1.5 mm thick. The present injection compression molding process 10 uses only a single 2-piece mold 38 in a continuous single manufacturing step. The mold halves 42, 44 include fixed mold half 42, moving mold half 44, and no further independently moving parts.

The injection compression molding process and injection compression molding system 10 of the present disclosure offer several advantages: 1) The process and system produces flow runners (distance "G") of 7 or more inches in length in a finished injection molded part allowing large surface area (greater than 1500 $cm^2$) parts to be formed; 2) The process and system provides a total injection and compression time of approximately 1.0 seconds or less which includes the initial step of injecting material to create the puddle shot (0.2 to 0.7 sec) plus the coining step (0.7 sec or less); 3) The process and system uses injection mold halves initially spaced apart from the final wall thickness dimension of the finished part which is subsequently closed either during or after the puddle shot is created in 0.7 seconds or less; 4) The process and system includes a coining step together with a blowing agent which can produce areas of different wall thickness in the same molded part in a single manufacturing step; 5) The process and system uses cooling temperatures of 10 C-80 C and preferably 10 C-50 C for most resins to provide a total cycle time of 1 minute or less per part; and 6) The process and system allows the use of a significantly reduced press size per unit area of finished part compared to standard injection molding processes.

The use of a foamed melt offers two primary advantages over a non-foamed melt when used in the present injection compression process. The first advantage of a foamed melt is a reduced cooling time thus reducing cycle time up to 20% (from approximately 50 sec for a non-foamed part down to approximately 40 sec for the present foamed part) when compared to a non-foamed melt process. It is believed that foaming of the melt once it is injected into the tool acts to pressurize the melt against the cooled walls of the mold, therefore enhancing the heat transfer between the tool wall and the molten plastic.

The second advantage of using a foamed melt in the present injection compression process is its ability to "pack out" the molten plastic inside the tool cavity, with the material expanding to fill all the areas of the tool. This packing action cannot be accomplished with known solid wall injection compression processes because by the time the material could be fully coined it would be starting to set up, thereby eliminating the possibility of packing out the tool. This packing action is also beneficial in filling thickened areas of the part such as in attachment zones. Sink marks and voiding may otherwise be present in the areas having increased wall thickness without the use of a foamed melt. The foamed melt helps to pack out the thickened areas thereby eliminating the sinks and voids.

Known coining processes use standard injection rates such as 5-15 cm per second and are used to create parts smaller than those of the present disclosure which have a surface area of approximately 1500 $cm^2$ or larger. The standard injection rates would translate into a fill time of 4-6 seconds when filling large parts over 1500 $cm^2$. This 4-6 second fill time coupled with the time to coin the part make it difficult to coin a large tool cavity. This is due to the molten plastic inside the large tool cavity beginning to solidify after a few seconds, and especially when the molten plastic is trapped between the cooling walls of the cavity. This solidification prevents the material from being subsequently fully coined. This explains why known coining processes are used only on small surface area parts (for example for polymeric material contact lenses) that can be filled in approximately 2 seconds instead of 4-6 seconds. Known coining processes also use specialty tools that insulate the molten plastic from the cooling walls of the tool. The present high speed injection compression process eliminates the need for specialty tools.

The present high speed injection compression process uses a non-standard injection rate of approximately 40 cm per second and can be as high as 100 cm per second coupled with a high speed position controlled clamp unit. The high speed injection delivers the shot required to fill a large part (larger than 1500 $cm^2$) in 0.7 seconds or less. This high speed injection (0.7 seconds or less) coupled with the use of a high speed positioned controlled clamp unit can complete both the of injection and compression processes in 1.0 second or less. The speed at which this process occurs even with a chilled tool advantageously does not allow the molten plastic to cool down such that it prevents finishing the coining/compression process.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An injection compression molding system, comprising:
a mold having a fixed first half and a second half displaceable with respect to the first half, the second half initially positioned such that a cavity between the first and second halves defines a first clearance sized to receive a puddle shot of a foamed or solid molten polymeric material, the first clearance selected to prevent the puddle shot from filling far extents of the cavity;
an injection molding device operating to inject the puddle shot into the cavity at an injection speed ranging from approximately 10 centimeters per second to approximately 86 centimeters per second; and
a displacement device acting after or during injection of the puddle shot to displace the second mold half toward the first mold half thereby creating a second clearance between the first and second mold halves less than the first clearance, the second clearance defining a finished part thickness whereby displacement of the second mold half to the second clearance compresses the puddle shot such that the puddle shot fills the far extents of the cavity and forms a finished part between the first and second mold halves, wherein the finished part has a surface area greater than approximately 1,500 square centimeters, and wherein a total time required to both inject the puddle shot and compress the puddle shot is less than or equal to 5.0 seconds.

2. The injection compression molding system of claim 1, wherein the injection molding device includes:
an injection molding screw; and
at least one accumulator sized to displace the injection molding screw and thereby to inject the puddle shot in 3.0 seconds or less.

3. The injection compression molding system of claim 1, wherein the finished part thickness is 2.0 millimeters or less.

4. The injection compression molding system of claim 1, wherein the finished part thickness is 1.5 millimeters or less.

5. The injection compression molding system of claim 1, wherein the finished part thickness is 1.0 millimeters or less.

6. The injection compression molding system of claim 1, wherein the displacement device generates a clamping force that is less than or equal to approximately 0.5 tons per square inch.

7. The injection compression molding system of claim 1, wherein the displacement device includes a high speed clamp acting in parallel to displace the second mold half to provide the second clearance in 2.0 seconds or less.

8. The injection compression molding system of claim 1, wherein the mold includes at least one drop through which the injection molding device injects the puddle shot into the cavity, the at least one drop being spaced from an edge of the finished part by a flow distance that is greater than 18.0 centimeters.

9. An injection compression molding system, comprising:
a mold having a fixed first half and a second half displaceable with respect to the first half, the second half initially positioned such that a cavity between the first and second halves defines a first clearance sized to receive a puddle shot of a foamed or solid molten polymeric material, the first clearance selected to prevent the puddle shot from filling far extents of the cavity;
an injection molding device operating to inject the puddle shot into the cavity in less than or equal to 0.7 seconds at an injection speed ranging from approximately 10 centimeters per second to approximately 86 centimeters per second; and
a displacement device acting after or during injection of the puddle shot to displace the second mold half toward the first mold half thereby creating a second clearance between the first and second mold halves less than the first clearance, the second clearance defining a finished part thickness whereby displacement of the second mold half to the second clearance compresses the puddle shot such that the puddle shot fills the far extents of the cavity and creates a finished part between the first and second mold halves, wherein the finished part has a surface area greater than approximately 1,500 square centimeters, and wherein a total time required to both inject the puddle shot and compress the puddle shot is less than or equal to 1.0 seconds.

10. An injection compression molding process, having an injection molding screw displaced by pressure supplied by a first accumulator, a mold having a fixed first half and a displaceable second half, and a variable position control clamp aligned with the dispersable second half of the mold, the method comprising steps including:
- initially positioning the displaceable second half of the mold such that a cavity between the fixed first half and the displaceable second half defines a first clearance;
- displacing the injection molding screw by application of pressure from the first accumulator to inject a puddle shot of a liquid polymeric material into the cavity at an injection speed ranging from approximately 10 centimeters per second to approximately 86 centimeters per second, wherein the puddle shot does not fill far extents of the cavity;
- actuating the variable position control clamp to displace the displaceable second half of the mold toward the fixed first half of the mold thereby compressing the puddle shot until a second clearance less than the first clearance and also defining a finished part thickness is created between the fixed first half and the displaceable second half of the mold; and
- performing the displacing and actuating steps in 0.7 seconds or less such that the liquid polymeric material of the puddle shot flows into the far extents of the cavity and a finished part is formed having a surface area greater than approximately 1,500 square centimeters.

* * * * *